United States Patent
Mayes, Jr.

(10) Patent No.: US 8,272,349 B2
(45) Date of Patent: Sep. 25, 2012

(54) BIRD FEEDING APPARATUS

(76) Inventor: Vernon Mayes, Jr., Columbia, SC (US)

( * ) Notice: Subject to any disclaimer, the term of this patent is extended or adjusted under 35 U.S.C. 154(b) by 4 days.

(21) Appl. No.: 12/537,689

(22) Filed: Aug. 7, 2009

(65) Prior Publication Data

US 2011/0030618 A1 Feb. 10, 2011

Related U.S. Application Data

(60) Provisional application No. 61/807,328, filed on Aug. 8, 2008.

(51) Int. Cl.
*A01K 39/01* (2006.01)
*A01K 5/015* (2006.01)
(52) U.S. Cl. .......... 119/51.03; 119/57.8; 119/51.01
(58) Field of Classification Search .......... 119/51.03, 119/51.01, 57.8
See application file for complete search history.

(56) References Cited

U.S. PATENT DOCUMENTS

| | | | | |
|---|---|---|---|---|
| 590,458 A | * | 9/1897 | Lee | 119/51.03 |
| 1,092,314 A | * | 4/1914 | White | 119/51.03 |
| 1,123,501 A | * | 1/1915 | Dreibelbis | 119/51.01 |
| 1,221,019 A | * | 4/1917 | Bowdish | 119/51.03 |
| 2,504,282 A | * | 4/1950 | Tobias | 119/51.03 |
| 3,273,537 A | * | 9/1966 | Orr | 119/51.03 |
| 3,399,650 A | | 9/1968 | Goodman | |
| 5,022,349 A | | 6/1991 | Bryant | |
| 5,189,985 A | * | 3/1993 | Brady et al. | 119/60 |
| 5,606,933 A | * | 3/1997 | Wilkins | 119/51.03 |
| 5,819,687 A | * | 10/1998 | Lister | 119/52.1 |
| 5,826,541 A | * | 10/1998 | Wilkins | 119/57.8 |
| 5,867,938 A | | 2/1999 | Dilernia | |
| 7,093,563 B1 | * | 8/2006 | Reynolds | 119/428 |
| 2006/0065207 A1 | * | 3/2006 | Louden | 119/464 |
| 2007/0084412 A1 | * | 4/2007 | Eager | 119/51.03 |

* cited by examiner

*Primary Examiner* — Son T Nguyen
*Assistant Examiner* — Kathleen Iwasaki
(74) *Attorney, Agent, or Firm* — Aidenbaum Schloff and Bloom PLLC; Jay Schloff

(57) ABSTRACT

A bird feeding apparatus for providing nutritious feed material to birds includes a first member and a second member pivotally coupled with the first member. The second member includes a base member and a lip member. The lip member extends upwardly from a first set of edges of the base member. The lip member is circumscribingly received around the first member, when the first member and the second member align with each other.

10 Claims, 4 Drawing Sheets

BIRD FEEDING APPARATUS

CROSS-REFERENCE TO RELATED APPLICATIONS

The present disclosure claims priority under 35 United States Code, Section 119 from the U.S. Provisional Patent Application No. 61/807,328 filed on Aug. 8, 2008, the disclosure of which is incorporated herein by reference.

FIELD OF THE DISCLOSURE

The present disclosure generally relates to animal feeding apparatuses, and, more particularly, to a bird feeding apparatus that is capable of providing a nutritional feed material to birds.

BACKGROUND OF THE DISCLOSURE

Nowadays, many people have developed bird feeding as an auxiliary activity and a means of entertainment. Various bird feeding apparatuses have also been specifically developed for feeding birds with feed material, such as a variety of seeds. In general, a bird feeding apparatus may be placed in either a backyard or a lawn of a home, to facilitate bird watching by an individual from his or her home. Specifically, the bird feeding apparatus may be suspended from a tree or a post.

Typically, conventional bird feeding apparatuses include feed material, specifically, birdseed kept in a container such as a tray and a bowl, which is provided in the bird feeding apparatus. However, the use of birdseed for feeding birds may prove costly as most birdseed available in the market is expensive.

Further, while eating and/or hoarding, the birds tend to scatter the birdseed on areas including ground in a backyard or a lawn, flower beds, and the like. The birdseed scattered on such various areas may create an unpleasant view for an owner of a house or for visitors. Furthermore, it may be tiresome for an individual to clean such areas having the scattered birdseeds thereon. In addition, the situation may worsen in the event that the scattered birdseed starts germinating, as the birdseeds then tend to accumulate and adhere to the specific areas. Accordingly, cleaning of such areas with the scattered birdseed may prove to be time-consuming for an individual.

Additionally, containers provided in various conventional bird feeding apparatuses for holding the birdseed therewithin are usually of a limited dimension. Accordingly, it may be laborious for an individual to refill the containers time and again with additional birdseed once the previously kept birdseed has been completely consumed by birds.

Moreover, the conventional bird feeding apparatuses are incapable of providing any protection against unwanted scavengers of the feed material. Examples of such scavengers include, but are not limited to, squirrels and other rodents. Accordingly, access to the feed material by such scavengers causes depletion of the feed material for consumption by the birds, thereby defeating the purpose of a bird feeder.

Accordingly, there exists a need for a bird feeding apparatus that is capable of providing nutritious feed material, in a convenient manner. Further, there exists a need for a bird feeding apparatus that is capable of preventing access of feed material stored within the bird feeding apparatus by scavengers, such as squirrels and other rodents. Furthermore, there exists a need for a bird feeding apparatus that is capable of preventing scattering and spilling of feed material on various areas including ground, flower beds, and the like, when the feed material is being consumed or hoarded by a bird.

SUMMARY OF THE DISCLOSURE

In view of the foregoing disadvantages inherent in the prior art, the general purpose of the present disclosure is to provide a bird feeding apparatus, configured to include all the advantages of the prior art, and to overcome the drawbacks inherent therein.

Therefore, an object of the present disclosure is to provide a bird feeding apparatus that is capable of providing nutritious feed material, in a convenient manner.

Another object of the present disclosure is to provide a bird feeding apparatus that is capable of preventing access of feed material stored within the bird feeding apparatus by scavengers, such as squirrels and other rodents.

Yet another object of the present disclosure is to provide a bird feeding apparatus that is capable of preventing scattering and spilling of feed material on various areas including ground, flower beds, and the like, when the feed material is being consumed or hoarded by a bird.

To achieve the above objects, in one aspect of the present disclosure, a bird feeding apparatus is provided. The bird feeding apparatus includes a first member and a second member pivotally coupled with the first member. The first member includes a plurality of crevices formed thereon for receiving a feed material therewithin. The first member simulates a bark of a tree. The second member includes a base member. The second member further includes a lip member extending upwardly from a first set of edges of the base member. The lip member is circumscribingly received around the first member to enclose a front surface of the first member, when the first member and the second member are aligned with each other.

In another aspect of the present disclosure, a bird feeding apparatus is provided that includes a first member. The first member includes a first flap element that simulates a bark of a tree. The first flap element includes a plurality of crevices formed on the first flap element for receiving a feed material therewithin. Further, the first member includes a second flap element pivotally coupled with the first flap element. The bird feeding apparatus also includes a second member pivotally coupled with the first member. The second member includes a base member and a lip member extending upwardly from a first set of edges of the base member. The lip member is circumscribingly received around the first member to enclose a front surface of the first flap element of the first member, when the first member and the second member are aligned with each other.

These together with other aspects of the present disclosure, along with the various features of novelty that characterize the present disclosure, are pointed out with particularity in the claims annexed hereto and form a part of this present disclosure. For a better understanding of the present disclosure, its operating advantages, and the specific objects attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

The exemplary embodiments described herein detail for illustrative purposes are subject to many variations in structure and design. It should be emphasized, however, that the present disclosure is not limited to a particular bird feeding apparatus, as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The use of terms, "including," or "comprising," and variations thereof herein is meant to encompass the items listed thereafter and equivalents thereof as well as additional items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Unless limited otherwise, the terms "attached," "secured," "coupled," and variations thereof herein are used broadly and encompass direct and indirect attachments, couplings, and arrangements. The term, "top," "bottom," "side," and the like, herein do not denote any order, elevation or importance, but rather are used to distinguish placement of one element over another.

The present disclosure relates to a bird feeding apparatus for providing nutritious feed material to birds. The term "bird" as used herein relates to birds such as woodpeckers, wrens, finches, chickadees, and sparrows. Further, the term "feed material" relates to nutritious and semi-solid food material including, but not limited to, peanut butter, jelly, butterscotch, and combinations thereof, meant to be consumed by birds. Furthermore, the term "user," as used herein below, refers to an owner of the bird feeding apparatus or an individual using the bird feeding apparatus for feeding birds.

The bird feeding apparatus of the present disclosure provides nutritious feed material to birds in a convenient manner. Further, use of the bird feeding apparatus prevents scavengers, such as squirrels and other rodents, from accessing the feed material stored therewithin. Furthermore, the use of the bird feeding apparatus prevents scattering and spilling of the feed material on various areas including ground, flower beds, and the like, when the feed material is being consumed or hoarded by the birds. Specifically, the feed material as used herein is incapable of being dripped or scattered. Different embodiments of the bird feeding apparatus of the present disclosure are explained in detail in conjunction with FIGS. 1-4.

Figure 1:
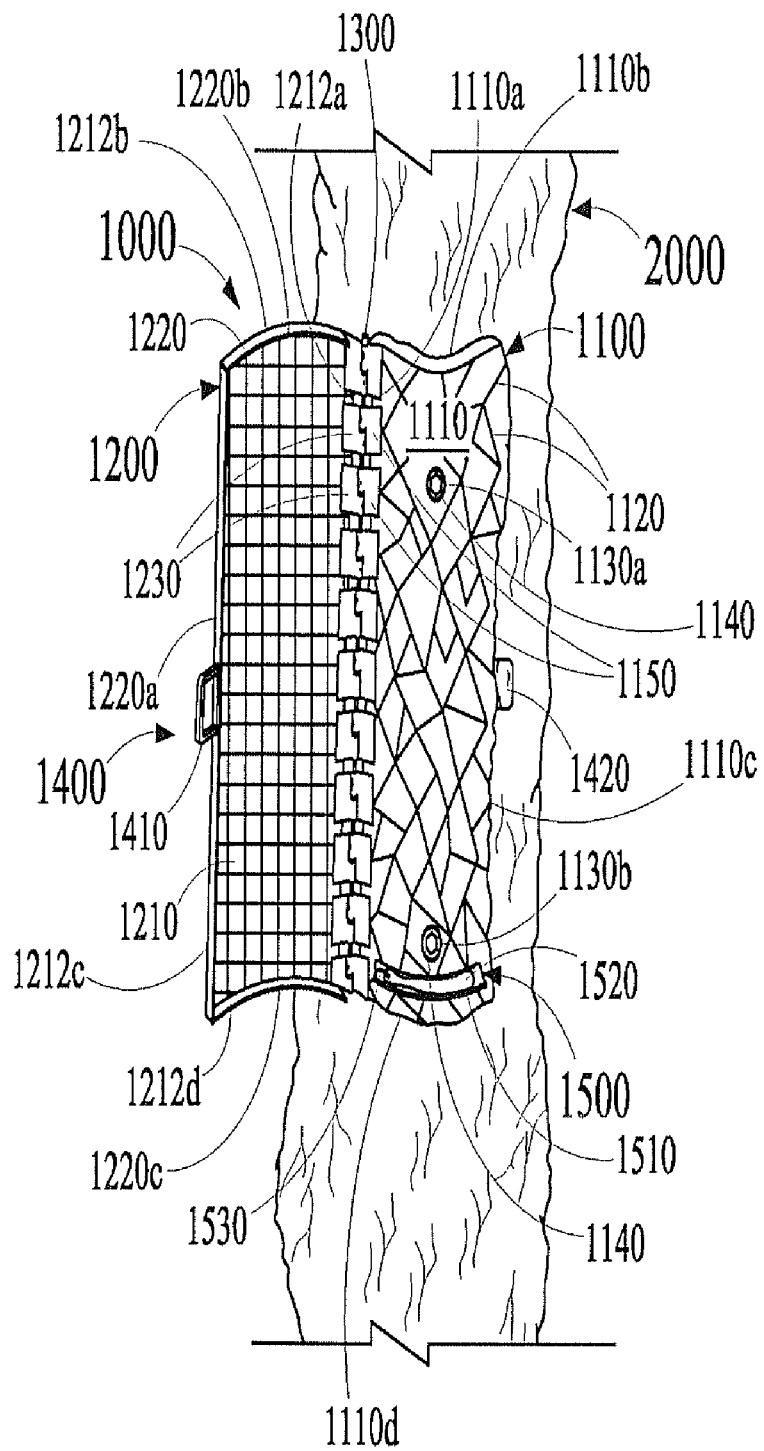
FIG. 1 depicts a front perspective view of a bird feeding apparatus in an open configuration, secured on a supporting structure, in accordance with an embodiment of the present disclosure.
Figure 2:
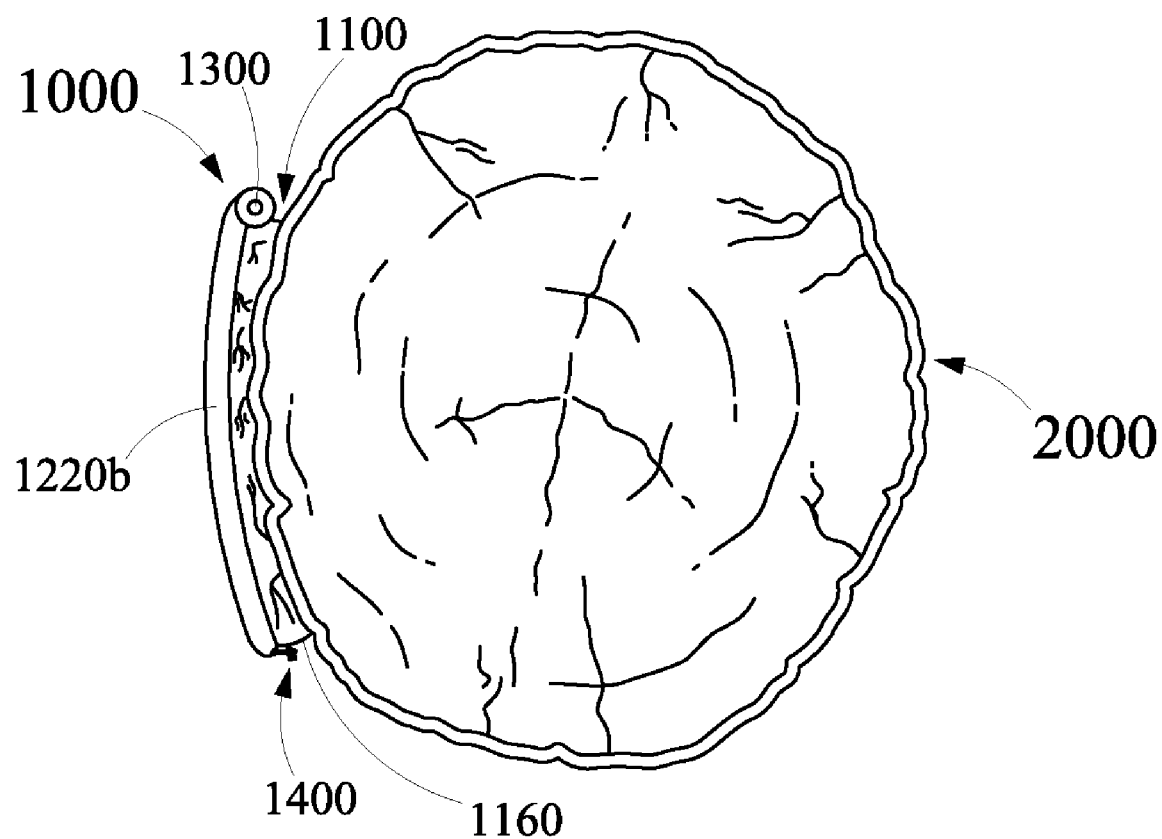
FIG. 2 depicts a top view of the bird feeding apparatus of FIG. 1 in a closed configuration, secured onto a supporting structure, in accordance with an embodiment of the present disclosure.

An embodiment of the present disclosure is explained in detail in conjunction with FIGS. 1 and 2. FIG. 1 depicts a front perspective view of a bird feeding apparatus 1000 in an open configuration, mounted on a supporting structure 2000, in accordance with an embodiment of the present disclosure. Further, FIG. 2 depicts a top view of the bird feeding apparatus 1000 in a closed configuration, mounted on the supporting structure 2000, in accordance with an embodiment of the present disclosure.

The bird feeding apparatus 1000 includes a first member 1100 and a second member 1200 (as shown in FIG. 1). The first member 1100 includes a front surface 1110 and a rear surface (not shown). Further, the first member 1100 includes a plurality of crevices 1120 formed on the first member 1100, and more specifically, on the front surface 1110 of the first member 1100 for receiving a feed material (not shown) therewithin. Each crevice of the plurality of crevices 1120 may have a shape of a diamond. However, it will be evident to a person skilled in the art that the each crevice may have any other shape, such as a triangular shape, a rectangular shape, and the like. Further, the each crevice may be formed to have a depth of about ⅜ inches. In the present embodiment of the present disclosure, the first member 1100 simulates a bark of a tree. More specifically, the first member 1100 simulates a bark of a hickory tree, i.e., the first member 1100 is configured as a simulated slab of a hickory tree. Further, the first member 1100 is composed of a hard plastic material. Examples of such a hard plastic material may include, but are not limited to, polypropylene plastic material and polystyrene plastic material. However, it may be evident to a person skilled in the art that the first member 1100 may be composed of any other material such as an aluminium material.

The first member 1100 also includes at least one aperture such as a first aperture 1130a and a second aperture 1130b (hereinafter collectively referred to as apertures 1130) configured thereon. Each aperture of the apertures 1130 is configured to receive a fastener 1140 therewithin for securing the bird feeding apparatus 1000, and more specifically, the first member 1100, onto the supporting structure 2000. The term, "supporting structure," as used herein refers to a tree. However, it may be evident to a person skilled in the art that the supporting structure 2000 may be a post or any other supporting structure that may be used for securing the bird feeding apparatus 1000.

The second member 1200 of the bird feeding apparatus 1000 includes a base member 1210 having a plurality of edges such as an edge 1212a, an edge 1212b, an edge 1212c, and an edge 1212d (as shown in FIG. 1). The plurality of edges including the edge 1212a, the edge 1212b, the edge 1212c, and the edge 1212d, may hereinafter be collectively referred to as "plurality of edges 1212". In the present embodiment of the present disclosure, the base member 1210 of the second member 1200 is composed as a sheet of a mesh structure, such as a wire mesh structure, to facilitate a bird to easily cling onto the second member 1200. The mesh structure may be composed of one of a metallic material and a metallic alloy material. For the purpose of this description, the base member 1210 of the second member 1200 is a wire mesh structure composed of galvanized wires.

The second member 1200 is pivotally coupled with the first member 1100 (as shown in FIG. 1). More specifically, the second member 1200 is pivotally coupled with the first member 1100 by means of a hinge pin mechanism that includes a plurality of hinge brackets, such as a plurality of hinge brackets 1150 (hereinafter referred to as "first hinge brackets 1150") a plurality of hinge brackets 1230 (hereinafter referred to as "second hinge brackets 1230"), and a hinge pin 1300. Specifically, the first hinge brackets 1150 are disposed on a first edge 1110a of a plurality of edges such as the edge 1110a, an edge 1110b, an edge 1110c, and an edge 1110d, of the front surface 1110 of the first member 1100. The second hinge brackets 1230 are disposed on the edge 1212a of the base member 1210 of the second member 1200. The first hinge brackets 1150 and the second hinge brackets 1230 engage with each other to configure a cavity (not shown) therebetween to receive the hinge pin 1300 within the cavity. The hinge pin mechanism enables the pivotal movement of the second member 1200 with respect to the first member 1100.

As shown in FIGS. 1 and 2, the first member 1100 and the second member 1200 are configured to have a concave shape to conform to the convex shape of the outer surface of a tree. However, it will be evident to a person skilled in the art that the first member 1100 and the second member 1200 may be configured to have any other shape depending on the shape of the supporting structure 2000.

Further, the second member 1200 partially covers the first member 1100 when the second member 1200 and the first member 1100 are aligned with each other. Specifically, the second member 1200 covers the front surface 1110 of the first member 1100. The second member 1200 includes a lip member 1220. The lip member 1220 extends upwardly from a first set of edges such as the edge 1212b, the edge 1212c, and the edge 1212d of the plurality of edges 1212 of the base member 1210. The lip member 1220 includes a plurality of portions such as a first portion 1220a, a second portion 1220b, and a third portion 1220c. The lip member 1220 is circumscribingly received around the first member 1100 to enclose the front surface 1110 of the first member 1100, when the second member 1200 and the first member 1100 align with each other. More specifically, the first portion 1220a, the second portion 1220b, and the third portion 1220c of the lip member 1220 are received around the first member 1100 when the second member 1200 aligns with the first member 1100 for covering the front surface 1110 of the first member 1100. Even more specifically, the first portion 1220a, the second portion 1220b, and the third portion 1220c of the lip member 1220 are received on a side portion (not numbered) of the first member 1100 when the second member 1200 aligns with the first member 1100 for covering the front surface 1110 of the first member 1100. Accordingly, the lip member 1220 prevents scavengers/animals, such as squirrels and other rodents, from accessing the feed material provided within the bird feeding apparatus 1000 for consumption by the birds.

The bird feeding apparatus 1000 further includes one or more closure mechanisms such as a closure mechanism 1400 for releasably securing the second member 1200 to the first member 1100 for facilitating the lip member 1220 to enclose the front surface 1110 of the first member 1100, as shown in FIGS. 1 and 2. More specifically, the closure mechanism 1400 includes a first engagement member such as a first engagement member 1410 configured on the first portion 1220a of the lip member 1220. The closure mechanism 1400 further includes a second engagement member such as a second engagement member 1420 configured on a side portion 1160 of the first member 1100 (as shown in FIG. 2). It will be evident that the first engagement member 1410 and the second engagement member 1420 may be configured on the lip member 1220 and the first member 1100 by a means such as an adhesive, and the like, as known in the art. Further, it will be evident to a person skilled in the art that the first engagement member 1410 may be configured on any other portion of the lip member 1220 and the second engagement member 1420 may be configured on a corresponding side portion of the first member 1100.

The first engagement member 1410 engages with the second engagement member 1420 when the second member 1200 is aligned with the first member 1100 for facilitating the lip member 1220 to enclose the front surface 1110 of the first member 1100 (as shown in FIG. 2). Examples of the closure mechanism 1400 may include, but are not limited to, a snap fit mechanism and a latch and clasp mechanism. For the purpose of this description and as shown in FIGS. 1 and 2, the closure mechanism 1400 is a latch and clasp mechanism, where the first engagement member 1410 is a latch and the second engagement member 1420 is a clasp.

Furthermore, the bird feeding apparatus 1000 includes an applicator assembly 1500. The applicator assembly 1500 includes a holder member 1510 and an applicator 1520 for applying the feed material onto the front surface 1110 of the first member 1100. The holder member 1510 is capable of holding the applicator 1520 thereon (as shown in FIG. 1). The holder member 1510 is disposed on the first member 1100. In an embodiment of the present disclosure, the applicator assembly 1500, and more specifically, the holder member 1510 is disposed on, and particularly, attached near the bottom edge of the front surface 1110 of the first member 1100 by means of an adhesive. However, it will be evident to a person skilled in the art that the holder member 1510 may be attached to the first member 1100 by any other means known in the art. For example, the holder member 1510 may be attached to the first member 1100 by means of one or more nuts and bolts. Further, the applicator 1520 is releasably attached to the holder member 1510 by any suitable means, such as using a string 1530. However, it will be evident to a person skilled in the art that the applicator 1520 may be attached to the holder member 1510 by means of a rope, hooks, clips and the like. The applicator 1520 and the holder member 1510 may be composed of a plastic material. Alternately, as described above, the applicator assembly 1500 may be similarly attached to either inside or the outside of the second member 1200, at a bottom portion thereof.

In use, a user may secure the bird feeding apparatus 1000, and more particularly, the first member 1100 to the supporting structure 2000 (as shown in FIGS. 1 and 2), by means of fasteners, such as the fastener 1140, that extend through the apertures 1130 and are received within a portion (not shown) of the supporting structure 2000. Thereafter, the user may spread the feed material, and more specifically, peanut butter onto the front surface 1110 of the first member 1100 with the help of the applicator 1520, such that the plurality of crevices 1120 configured on the front surface 1110 of the first member 1100 receive the feed material therewithin; and replace the applicator 1520 to the holder member 1510. The user may then cover the first member 1100, and more specifically, the front surface 1110 of the first member 1100 with the second member 1200. Specifically, the second member 1200 may be releasably secured to the first member 1100 by means of the closure mechanism 1400. More specifically, the first engagement member 1410 of the closure mechanism 1400 is engaged with the second engagement member 1420 of the closure mechanism 1400. The mesh structure of the base member 1210 of the second member 1200 enables one or more birds to cling on to the second member 1200 for conveniently accessing and consuming/hoarding the feed material provided on the front surface 1110 and the plurality of crevices 1120 of the first member 1100. The employment of the lip member 1220 of the second member 1200, which is received on the side portion of the first member 1100 for enclosing the front surface 1110 of the first member 1100, helps preventing various scavengers/animals, such as squirrels and other rodents, from accessing and consuming the feed material intended to be accessed and consumed by the one or more birds.

The bird feeding apparatus 1000 may be manufactured in a variety of sizes. For example, the first member 1100 of the bird feeding apparatus 1000 may have a width of about six inches, a length of about twelve inches, and a height of about ¾ inches. Further, the lip member 1220 may have a height of about half an inch. However, it will be evident to a person skilled in the art that the bird feeding apparatus 1000 may be manufactured to have any other dimension as per a user's preferences and/or as per the manufacturer's preferences.

Figure 3:
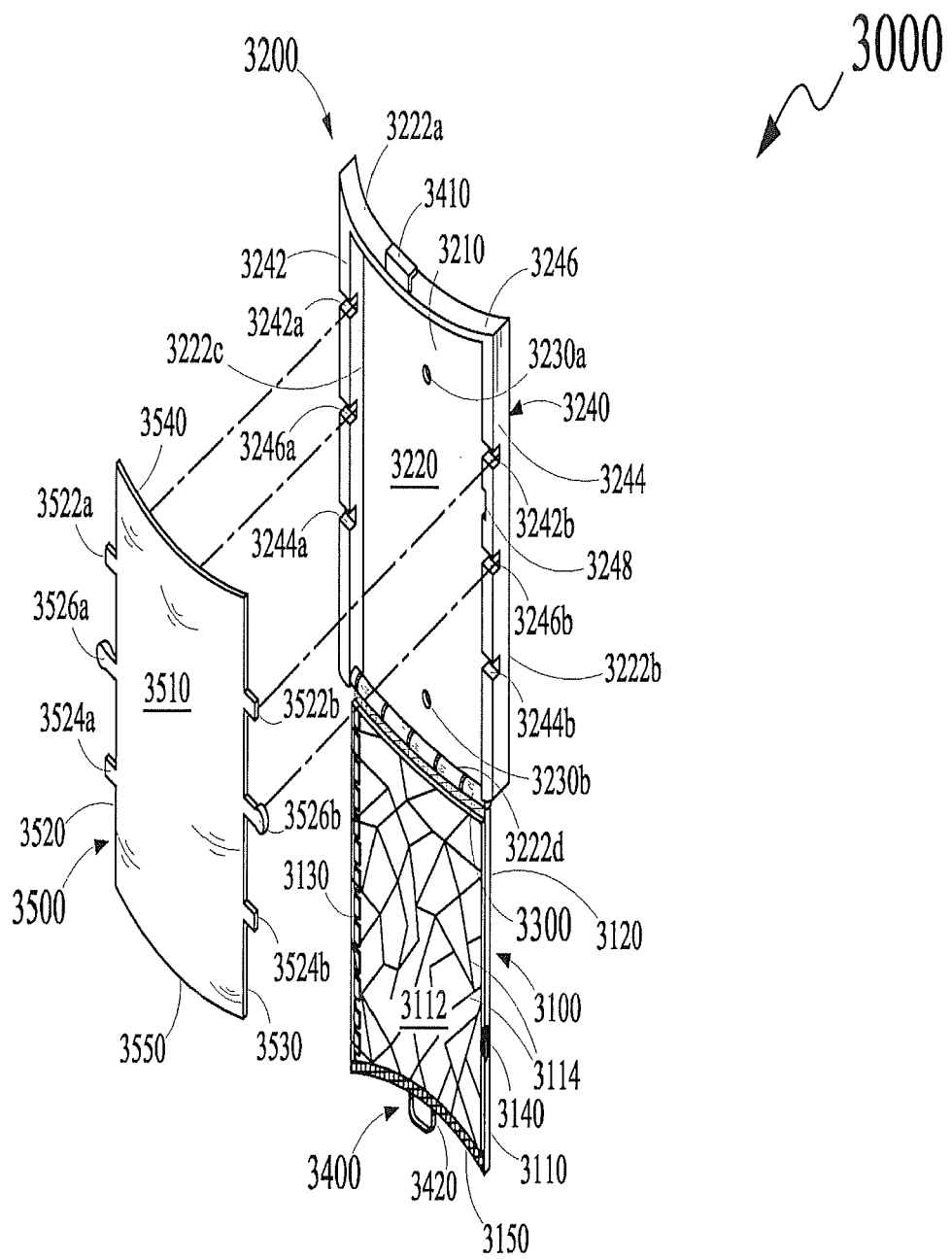
FIG. 3 depicts an exploded view of a bird feeding apparatus, in accordance with another embodiment of the present disclosure.
Figure 4:
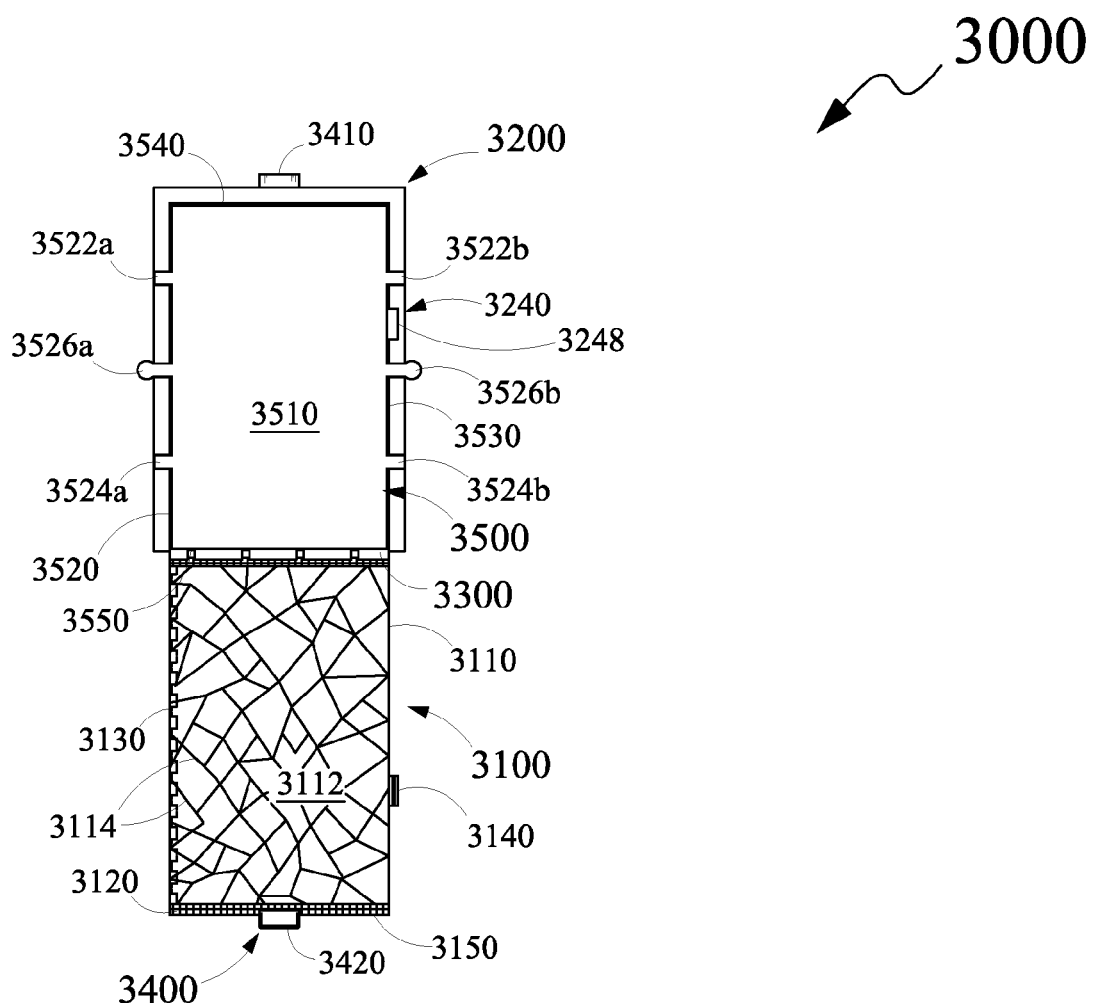
FIG. 4 depicts a front view of the bird feeding apparatus of FIG. 3, in a partially open configuration, in accordance with an embodiment of the present disclosure.

Another embodiment of the present disclosure is explained in detail in conjunction with FIGS. 3 and 4. FIG. 3 depicts an exploded view of a bird feeding apparatus 3000, in accordance with this embodiment of the present disclosure. FIG. 4 depicts a front view of the bird feeding apparatus 3000, in a partially open configuration, in accordance with the above embodiment of the present disclosure.

The bird feeding apparatus 3000 includes a first member 3100, and a second member 3200. The first member 3100 includes a first flap element 3110 and a second flap element 3120. The first flap element 3110 is hingedly coupled with the second flap element 3120 by means of a hinge pin mechanism 3130. The hinge pin mechanism 3130 is disposed between a first side portion (not numbered) of the first flap element 3110 and a corresponding first side portion (not numbered) of the second flap element 3120. The hinge pin mechanism 3130 is similar to the hinge pin mechanism as described in conjunction with FIG. 1. For the sake of brevity, the hinge pin mechanism 3130 is not explained herein. The first flap element 3110 includes a front surface 3112 and a rear surface (not shown). Further, the first flap element 3110 includes a plurality of crevices 3114 formed thereon and extending from the front surface 3112 to the rear surface while forming through holes on the first flap element 3110. The plurality of crevices 3114 is formed on the first flap element 3110 for receiving a feed material (not shown) therewithin. Each crevice of the plurality of crevices 3114 has a shape of a diamond. However, it will be evident to a person skilled in the art that the each crevice of the plurality of crevices 3114 may be designed to have any other shape, such as a triangular shape, a rectangular shape, and the like.

Such an arrangement of the plurality of crevices 3114 on the first flap element 3110 facilitates the first flap element 3110 to simulate a bark of a tree. In the present embodiment of the present disclosure, the first flap element 3110 simulates a bark of a hickory tree. Specifically, the first flap element 3110 is configured as a simulated slab of a hickory tree. The first flap element 3110 is composed of a hard plastic material. Examples of the hard plastic material may include, but are not limited to, polypropylene plastic material and polystyrene plastic material. However, it may be evident to a person skilled in the art that the first flap element 3110 may be composed of any other material such as an aluminium material.

In the present embodiment of the present disclosure, the second flap element 3120 of the first member 3100 is composed as a sheet of a mesh structure, such as a wire mesh structure, to facilitate a bird in easily holding onto the second flap element 3120. The second flap element 3120 serves as a cover of the first flap element 3110. The mesh structure may be composed of one of a metallic material and a metallic alloy material. For the purpose of this description, the second flap element 3120 of the first member 3100 is a wire mesh structure composed of galvanized wires.

The first member 3100 further includes one or more fastening mechanisms such as a fastening mechanism 3140 for releasably securing the first flap element 3110 to the second flap element 3120, as shown in FIGS. 3 and 4. More specifically, the fastening mechanism 3140 includes a first fastening member (not numbered) configured on a second side portion (not numbered) of the first flap element 3110. The fastening mechanism 3140 further includes a second fastening member (not numbered) configured on a corresponding second side portion (not numbered) of the second flap element 3120. It will be evident that the first fastening member and the second fastening member may be configured on the first flap element 3110 and the second flap element 3120 by a means such as an adhesive, and the like, as known in the art. The first fastening member engages with the second fastening member when the first flap element 3110 is aligned with the second flap element 3120 (as shown in FIGS. 3 and 4). Examples of the fastening mechanism 3140 may include, but are not limited to, a snap fit mechanism and a latch and clasp mechanism.

The second member 3200 of the bird feeding apparatus 3000 includes a base member 3210 (as shown in FIG. 3). The base member 3210 includes a front surface 3220 and a rear surface (not shown). The base member 3210 includes at least one aperture, such as a first aperture 3230a and a second aperture 3230b (hereinafter referred as apertures 3230) configured thereon. Specifically, the apertures 3230 extend from the front surface 3220 to the rear surface of the base member 3210. Each aperture of the apertures 3230 receives a fastener (not shown) for securing the base member 3210 onto a supporting structure, such as a tree (not shown). However, it may be evident to a person skilled in the art that the supporting structure may be a post, or any other supporting structure that is capable of securing the bird feeding apparatus 3000 thereon.

The second member 3200 is pivotally coupled with the first member 3100. More specifically, the second member 3200 is pivotally coupled with the first member 3100 by means of a hinge mechanism 3300. However, it may be evident to a person skilled in the art that the hinge mechanism 3300 may be a hinge pin mechanism, such as the hinge pin mechanism as explained in conjunction with FIGS. 1 and 2. Further, as shown in FIG. 3, the first member 3100 and the second member 3200 are configured to have a concave shape. However, it will be evident to a person skilled in the art that the first member 3100 and the second member 3200 may be configured to have any other shape depending on the shape of the supporting structure.

Furthermore, the first member 3100 is capable of being received on the second member 3200 when the second member 3200 and the first member 3100 are aligned with each other. Specifically, the second member 3200 includes a lip member 3240 (as shown in FIG. 3). The lip member 3240 extends upwardly from a first set of edges such as an edge 3222a, an edge 3222b, and an edge 3222c of a plurality of edges such as the edge 3222a, the edge 3222b, the edge 3222c, and an edge 3222d of the front surface 3220 of the base member 3210. The plurality of edges such as the edge 3222a, the edge 3222b, the edge 3222c, and the edge 3222d of the front surface 3220 of the base member 3210 are hereinafter collectively referred to as "plurality of edges 3222".

As described above, the lip member 3240 extends upwardly from the edge 3222a, the edge 3222b, and the edge 3222c of the front surface 3220 of the base member 3210. The lip member 3240 is circumscribingly received around the first member 3100 to enclose the front surface 3112 of the first flap element 3110 of the first member 3100 when the second member 3200 and the first member 3100 align with each other. The lip member 3240 includes a plurality of portions such as a first portion 3242, second portion 3244, which is configured opposite to the first portion 3242, and a third portion 3246. The first portion 3242 and the second portion 3244 are positioned in a space apart relation, such that the first portion 3242, the second portion 3244, and the third portion 3246 form an enclosed space (not numbered) therewithin, in order to facilitate the second member 3200 to assume a shape of a box with one open end portion (not numbered) at the edge 3222d that configures the hinge mechanism 3300 thereon.

The lip member 3240 further includes at least one first pair of slots disposed symmetrically about the vertical axis of the lip member 3240. For the purpose of this description, the lip member 3240 includes two of such first pair of slots. Each first pair of slots of the at least one first pair of slots further includes a first slot, such as a first slot 3242a and a first slot 3244a, formed on the first portion 3242 of the lip member 3240. Further, the each first pair of slots of the at least one first pair of slots further includes a second slot such as a second slot 3242b and a second slot 3244b, formed on the second portion 3244 of the lip member 3240.

The lip member 3240 also includes at least one second pair of slots disposed symmetrically about the vertical axis of the lip member 3240. For the purpose of this description, the lip member 3240 includes one of such second pair of slots. Each second pair of slots of the at least one second pair of slots further includes a third slot, such as a third slot 3246a formed on the first portion 3242 of the lip member 3240. Further, the each second pair of slots of the at least one second pair of slots further includes a fourth slot such as a fourth slot 3246b formed on the second portion 3244 of the lip member 3240.

Furthermore, the lip member 3240 includes a slot 3248 formed on the second portion 3244 of the lip member 3240. The slot 3248 receives the fastening mechanism 3140 when the first member 3100 aligns with the second member 3200.

The bird feeding apparatus 3000 further includes one or more closure mechanisms, such as a closure mechanism 3400, for releasably securing the first member 3100 to the second member 3200 (as shown in FIGS. 3 and 4). More specifically, the closure mechanism 3400 includes a first engagement member, such as a first engagement member 3410, configured on the third portion 3246 of the lip member 3240. The closure mechanism 3400 further includes a second engagement member, such as a second engagement member 3420, configured on a side portion 3150 of the first member 3100, and more specifically, of the second flap element 3120 of the first member 3100. It will be evident to a person skilled in the art that the first engagement member 3410 and the second engagement member 3420 may be configured on the lip member 3240 and the first member 3100 by a means, such as an adhesive and the like, as known in the art. Further, it will be evident to a person skilled in the art that the first engagement member 3410 may be configured on any other portion of the lip member 3240 and the second engagement member 3420 may be configured on a corresponding side portion of the first member 3100. The first engagement member 3410 engages with the second engagement member 3420 when the first member 3100 is aligned with the second member 3200 to facilitate the lip member 3240 to enclose the front surface 3112 of the first flap element 3110 of the first member 3100.

Examples of the closure mechanism 3400 may include, but is not limited to a snap fit mechanism, and a latch and clasp mechanism. For the purpose of this description and as shown in FIGS. 3 and 4, the closure mechanism 3400 is a latch and clasp mechanism, where the first engagement member 3410 is a clasp and the second engagement member 3420 is a latch.

The bird feeding apparatus 3000 also includes a tray member 3500 (as shown in FIG. 3) slidably coupled with the second member 3200. The tray member 3500 is capable of carrying the feed material applied on a front surface 3510 thereof. Further, the tray member 3500 includes a plurality of side portions such as a first side portion 3520, a second side portion 3530, a third side portion 3540, and a fourth side portion 3550. Furthermore, the tray member 3500 includes at least one pair of protruding elements. Each pair of protruding elements of the at least one pair of protruding elements includes a first protruding element, such as a first protruding element 3522a and a first protruding element 3524a, disposed on the first side portion 3520 of the tray member 3500. Further, the each pair of protruding elements of the at least one pair of protruding elements includes a second protruding element, such as a second protruding element 3522b and a second protruding element 3524b, disposed on the second side portion 3530 of the tray member 3500. Each protruding element of the each pair of protruding elements serves as a gliding element. The tray member 3500 also includes at least one pair of pull knob elements. Each pair of pull knob elements of the at least one pair of pull knob elements includes a first pull knob element 3526a disposed on the first side portion 3520 and a second pull knob element 3526b disposed on the second side portion 3530 of the tray member 3500.

Furthermore, as shown in FIG. 4, the tray member 3500 is slidably coupled with the second member 3200. Specifically, the tray member 3500 is slidably coupled with the second member 3200 such that the at least one first pair of slots and the at least one second pair of slots of the lip member 3240 receive the at least one pair of protruding elements and the at least one pair of pull knob elements of the tray member 3500, respectively. More specifically, the first slots 3242a and 3244a, and the second slots 3242b and 3244b receive the first protruding elements 3522a and 3524a, and the second protruding elements 3522b and 3524b, respectively. Further, the third slot 3246a and the fourth slot 3246b are allowed to receive the first pull knob element 3526a and the second pull knob element 3526b, respectively. Accordingly, the tray member 3500 fits snugly within the plurality of portions of the lip member 3240 of the second member 3200 for facilitating a slidable coupling of the tray member 3500 with the second member 3200.

For the purpose of this description, each of the first pull knob element 3526a and the second pull knob element 3526b includes a pull knob portion (not numbered) and an elongated portion (not numbered). Specifically, elongated portions of the first pull knob element 3526a and the second pull knob element 3526b are received within the third slot 3246a and the fourth slot 3246b, respectively. Further, pull knob portions of the first pull knob element 3526a and the second pull knob element 3526b extend outwardly from the third slot 3246a and the fourth slot 3246b, respectively, to be held by a user for slidably decoupling/pulling-out the tray member 3500 from the second member 3200.

In use, a user may secure the second member 3200 to the supporting structure, by means of two fasteners that extend through the apertures 3230 and are received within portions (not shown) of the supporting structure. Thereafter, the user may spread the feed material, and more specifically, peanut butter, onto the front surface 3510 of the tray member 3500 with the help of an applicator, such as the applicator 1520 as explained in FIG. 1, in a quick and easy manner. Subsequently, the tray member 3500 carrying the feed material on the front surface 3510 thereof is slidably coupled with the second member 3200. Thereafter, the first member 3100 is aligned with the second member 3200 such that the front surface 3510 of the tray member 3500 faces the front surface 3112 of the first flap element 3110 of the first member 3100. Further, the second member 3200 may be releasably secured with the first member 3100 by means of the closure mechanism 3400. More specifically, the first engagement member 3410 of the closure mechanism 3400 is engaged with the second engagement member 3420 of the closure mechanism 3400.

The feed material carried on the front surface 3510 of the tray member 3500 is received within the plurality of crevices 3114 of the first flap element 3110 of the first member 3100 when the second member 3200 and the first member 3100 are aligned with each other and further secured, such that one or more birds may access the feed material from within the plurality of crevices 3114 either for consumption or for hoarding. Specifically, the feed material seeps into the plurality of crevices 3114 when the second member 3200 and the first member 3100 are aligned with each other. Accordingly, the first member 3100 serves as a cover, which snugly fits within the enclosed space provided by the lip member 3240 once the tray member 3500 is slidably coupled with the second member 3200, for facilitating the feed material to be seeped through the first member 3100.

The bird feeding apparatus 3000 may be fabricated in a variety of sizes. Preferably, the first flap element 3110 of the first member 3100 of the bird feeding apparatus 3000 may have a thickness of about ⅜ inches. Further, the lip member 3240 may have a height of about half an inch. However, it will be evident to a person skilled in the art that the bird feeding apparatus 3000 may be manufactured to have any other dimension as per a user's preferences and/or as per the manufacturer's preferences.

The disclosed bird feeding apparatuses, such as the bird feeding apparatus 1000 and the bird feeding apparatus 3000, of the present disclosure are capable of providing nutritious feed material to one or more birds in a convenient manner. The bird feeding apparatuses are characteristic of exhibiting a natural appearance and are capable of being employed in any landscape areas. Also, the bird feeding apparatuses are capable of being quickly and easily installed on a supporting structure, such as a tree. Further, the use of the bird feeding apparatuses is cost-effective, as the feed material such as peanut butter, utilized in the bird feeding apparatuses is inexpensive and easy-to-apply. Furthermore, the use of the bird feeding apparatuses prevents access of the feed material stored therewithin by scavengers/animals, such as squirrels and other rodents. Moreover, the use of the bird feeding apparatuses of the present disclosure prevents scattering and spilling of the feed material on various areas including ground, flower beds, and the like, when the feed material is being consumed or hoarded by a bird.

Moreover, large amount of the feed material may be provided at one instance within the bird feeder apparatuses of the present disclosure. Specifically, one serving of the feed material may last for many days when the bird feeder apparatus 1000 is utilized for bird feeding. On the other hand, one serving of the feed material may last for months when the bird feeder apparatus 3000 is utilized for bird feeding. Additionally, birds may enjoy while consuming the feed material provided by the means of the bird feeding apparatuses of the present disclosure and may regularly desire to return to the respective locations of the bird feeding apparatuses. Specifically, birds enjoy pecking through a caged structure formed with the employment of the second member 1200 in case of the bird feeding apparatus 1000, or with the employment of the first member 3100 in case of the bird feeding apparatus 3000.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present disclosure.

What is claimed is:

1. A bird feeding apparatus comprising:
    a first member comprising a plurality of crevices formed on the first member for receiving a feed material therewithin, wherein the first member simulates a bark of a tree;
    a second member pivotally coupled with the first member, the second member comprising,
        a base member, and
        a lip member extending upwardly from a first set of edges of the base member, wherein the lip member circumscribingly receives the first member to enclose a front surface of the first member, when the first member and the second member are aligned with each other,
    such that the plurality of crevices limit the amount of feed material accessible for feeding a bird when the first member and the second member are aligned with each other; and
    a tray member slidably coupled with the second member, the tray member being capable of carrying the feed material on a front surface of the tray member, wherein the front surface of the tray member faces the front surface of the first member when the first member and the second member are aligned with each other, such that the feed material is received within the plurality of crevices formed on the first member;
    wherein the tray member comprises at least one pair of protruding elements, each pair of protruding elements of the at least one pair of protruding elements comprising, a first protruding element disposed on a first side portion of the tray member, and a second protruding element disposed on a second side portion of the tray member and at least one pair of pull knob elements, each pair of pull knob elements of the at least one pair of pull knob elements comprising, a first pull knob element disposed on the first side portion of the tray member, and a second pull knob element disposed on the second side portion of the tray member.

2. The bird feeding apparatus of claim 1, further comprising one or more closure mechanisms for releasably securing the second member with the first member, each of the one or more closure mechanisms comprising,
    a first engagement member configured on the lip member, and a
    second engagement member configured on the first member, wherein the first engagement member engages with the second engagement member when the first member and the second member are aligned with each other.

3. The bird feeding apparatus of claim 1, wherein the first member is composed of a plastic material.

4. A bird feeding apparatus comprising:
a first member comprising,
   a first flap element comprising a plurality of crevices formed on the first flap element for receiving a feed material therewithin, wherein the first flap element simulates a bark of a tree, and
   a second flap element coupled with the first flap element;
a second member pivotally coupled with the first member, the second member comprising,
   a base member, and
   a lip member extending upwardly from a first set of edges of the base member, wherein the lip member circumscribingly receives the first member to enclose a front surface of the first flap element of the first member, when the first member and the second member are aligned with each other,
   such that the plurality of crevices limit the amount of feed material accessible for feeding a bird when the first member and the second member are aligned with each other; and
a tray member slidably coupled with the second member, the tray member being capable of carrying the feed material on a front surface of the tray member, wherein the front surface of the tray member faces the front surface of the first flap element of the first member when the first member and the second member are aligned with each other, such that the feed material is received within the plurality of crevices formed on the first flap element of the first member;
wherein the tray member comprises at least one pair of protruding elements, each pair of protruding elements of the at least one pair of protruding elements comprising, a first protruding element disposed on a first side portion of the tray member, and a second protruding element disposed on a second side portion of the tray member and at least one pair of pull knob elements, each pair of pull knob elements of the at least one pair of pull knob elements comprising, a first pull knob element disposed on the first side portion of the tray member, and a second pull knob element disposed on the second side portion of the tray member.

5. The bird feeding apparatus of claim 4, wherein the lip member comprises,
   at least one first pair of slots, each first pair of slots of the at least one first pair of slots comprising,
      a first slot formed on a first portion of the lip member for receiving the first protruding element therewithin, and
      a second slot formed on a second portion of the lip member for receiving the second protruding element therewithin; and
   at least one second pair of slots, each second pair of slots of the at least one second pair of slots comprising,
      a third slot formed on the first portion of the lip member for receiving the first pull knob element therewithin, and
      a fourth slot formed on the second portion of the lip member for receiving the second pull knob element therewithin,
   wherein the first portion of the lip member is configured opposite to the second portion of the lip member in a spaced apart relation.

6. The bird feeding apparatus of claim 4, wherein the second member further comprises at least one aperture configured on the base member, each aperture of the at least one aperture being capable of receiving a fastener for securing the second member onto a supporting structure.

7. The bird feeding apparatus of claim 4, wherein the second flap element of the first member is composed as a sheet of a mesh structure.

8. The bird feeding apparatus of claim 7, wherein the mesh structure is composed of one of a metallic material and a metallic alloy material.

9. The bird feeding apparatus of claim 4, wherein the first member further comprises one or more fastening mechanisms for releasably securing the first flap element with the second flap element.

10. The bird feeding apparatus of claim 4, further comprising one or more closure mechanisms for releasably securing the second member with the first member, each of the one or more closure mechanisms comprising,
   a first engagement member configured on the lip member, and
   a second engagement member configured on the second flap element of the first member,
   wherein the first engagement member engages with the second engagement member when the first member and the second member are aligned with each other.

* * * * *